(12) United States Patent
Narita et al.

(10) Patent No.: US 8,950,811 B2
(45) Date of Patent: Feb. 10, 2015

(54) SEAT RECLINING APPARATUS

(75) Inventors: Masafumi Narita, Chita-gun (JP);
Masaharu Nakamura, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 192 days.

(21) Appl. No.: 13/446,451

(22) Filed: Apr. 13, 2012

(65) Prior Publication Data

US 2012/0267932 A1 Oct. 25, 2012

(30) Foreign Application Priority Data

Apr. 22, 2011 (JP) ................................. 2011-096172

(51) Int. Cl.
*B60N 2/225* (2006.01)
(52) U.S. Cl.
CPC ............ *B60N 2/2252* (2013.01); *B60N 2/2254* (2013.01)
USPC ..................................... 297/362; 297/362.11
(58) Field of Classification Search
USPC ............................................ 297/362, 362.11
See application file for complete search history.

(56) References Cited

U.S. PATENT DOCUMENTS

| | | | | |
|---|---|---|---|---|
| 7,086,699 B1 * | 8/2006 | Addison et al. | ............... | 297/374 |
| 7,484,806 B2 * | 2/2009 | Ito et al. | ............... | 297/362 |
| 7,731,289 B2 * | 6/2010 | Matsumoto et al. | ............... | 297/362 |
| 8,033,606 B2 * | 10/2011 | Mitsuhashi | ............... | 297/362 |
| 2009/0301247 A1 * | 12/2009 | Mitsuhashi et al. | ............... | 74/466 |
| 2010/0201174 A1 * | 8/2010 | Ito | ............... | 297/362 |
| 2010/0244530 A1 * | 9/2010 | Kitano et al. | ............... | 297/362 |
| 2010/0308634 A1 | 12/2010 | Narita et al. | | |

FOREIGN PATENT DOCUMENTS

| | | |
|---|---|---|
| JP | 2001-340154 | 12/2001 |
| JP | 2008-200442 | 9/2008 |

* cited by examiner

*Primary Examiner* — David R Dunn
*Assistant Examiner* — Tania Abraham
(74) *Attorney, Agent, or Firm* — Oblon, Spivak, McClelland, Maier & Neustadt, L.L.P.

(57) ABSTRACT

A seat reclining apparatus includes a first member including a first tubular portion, a second member including a second tubular portion, a pair of wedge members each including a protruding portion, a biasing member biasing the wedge members, an input member pressing the protruding portion to rotate the wedge members, a pressing point via which the input member presses the wedge member, a radially inward contact point via which the wedge member is contactable with the first tubular portion, and a radially outward contact point via which the wedge member is contactable with the second tubular portion, wherein in a state where a biasing force of the biasing member is largest because of a dimensional variation in manufacturing, a pressing force line passing through the pressing point is identical to an intermediate line between first and second tangent lines passing through the radially inward and outward contact points.

10 Claims, 8 Drawing Sheets

SEAT RECLINING APPARATUS

CROSS REFERENCE TO RELATED APPLICATIONS

This application is based on and claims priority under 35 U.S.C. §119 to Japanese Patent Application 2011-096172, filed on Apr. 22, 2011, the entire content of which is incorporated herein by reference.

TECHNICAL FIELD

This disclosure generally relates to a seat reclining apparatus.

BACKGROUND DISCUSSION

JP2008-200442A (which will be hereinafter referred to as Reference 1) discloses a known seat reclining apparatus including a stepless adjustment mechanism. Reference 1 discloses how wedge members are pressed by an input member rotating the wedge members when the input member is driven by a motor. The input member is provided at an end portion of each of the wedge members in a circumferential direction of the wedge member. The input member is configured so that a pressing force line thereof is arranged between radially inward and outward contact points of the wedge member relative to first and second gear members, respectively (the first and second gear members correspond to first and second members). For example, when the input member is driven by the motor, the wedge member is pressed by the input member so as to rotate in a direction from a small-clearance portion to a large-clearance portion of an accommodating chamber (an accommodating space) formed by the first member and the second member. At this time, friction resistance of the wedge member may be minimized by the aforementioned configuration of the seat reclining apparatus of Reference 1. Additionally, a pressing point via which a pressing surface of the input member presses the wedge member is designed to be positioned at an outward side of the pressing surface in a radial direction of the pressing surface so that the pressing force line may be surely positioned between the radially inward and outward contact points of the wedge member even in a case dimensional variations in manufacturing occur.

However, according to the seat reclining apparatus disclosed in Reference 1, the end portion of the wedge member in the circumferential direction is pressed by the input member. Accordingly, the pressing point of the input member is located away from the radially inward and outward contact points. Therefore, for example, in a case where the radially inward contact point or the radially outward contact point may not be accurately arranged because of positional or dimensional errors of the accommodating chamber due to dimensional variations in manufacturing of the first member or the second member or in a case where the pressing force line may not be accurately arranged because of dimensional variations in manufacturing of the wedge member, the pressing force line is unlikely to be surely positioned between the radially inward and outward contact points. As a result, high manufacturing accuracy is required for each of the first member, the second member, and the wedge member of Reference 1.

JP2001-340154A (which will be hereinafter referred to as Reference 2) discloses a known seat reclining apparatus including a stepless adjustment mechanism in the same way as the seat reclining apparatus of Reference 1. A protruding portion extending in a direction of a central axial of an input member (a shaft) is formed at each of wedge members. In addition, when the input member is driven by a motor, the input member presses the protruding portion of the wedge member to thereby rotate the wedge member. Therefore, a shape of the input member may be simplified according to the seat reclining apparatus of Reference 1. Moreover, the wedge members are covered by an axial end surface of an annular flat portion (of a cam portion) of the input member, thereby being restricted from shifting in the direction of the central axis of the input member.

According to the seat reclining apparatus disclosed in Reference 2, a pressing point via which the input member presses the wedge member is arranged at the protruding portion of the wedge member; therefore, the pressing point is deviated from contact points (radially inward and outward contact points) of the wedge member relative to a gear plate (the first member) and an upper arm (the second member) in the direction of the central axis of the input member. Accordingly, depending on the setting of a pressing force line, an axial component of offset load may be applied to the wedge member. Consequently, when the wedge member is rotated by the input member driven by the motor, a load may be unevenly applied to inner and outer circumferential contact surfaces of the wedge member relative to the first member and the second member. As a result, the wedge member is partially worn, therefore disturbing the wedge member from smoothly rotating or sliding, deteriorating the strength of the wedge member, and generating noises when the wedge member rotates or slides.

A need thus exists for a seat reclining apparatus, which is not susceptible to the drawbacks mentioned above.

SUMMARY

According to an aspect of this disclosure, a seat reclining apparatus includes a first member adapted to be attached to one of a seat cushion and a seat back and including an internal gear and a first tubular portion positioned coaxially with the internal gear and arranged at an inner circumferential side of the internal gear, a second member adapted to be attached to the other of the seat cushion and the seat back and including an external gear and a second tubular portion into which the first tubular portion is inserted, the external gear having teeth fewer than teeth of the internal gear and engaging with the internal gear, the second tubular portion being positioned coaxially with the external gear and arranged at an inner circumferential side of the external gear, a pair of wedge members arranged in an annular accommodating chamber formed between an outer circumferential surface of the first tubular portion and an inner circumferential surface of the second tubular portion, each of the wedge members including a protruding portion axially protruding from the accommodating chamber, a biasing member biasing the pair of wedge members in a direction to separate the pair of wedge members from each other in a circumferential direction of the pair of wedge members, an input member having a central axis coaxial with the first tubular portion, the input member rotating to press the protruding portion along the circumferential direction to rotate the pair of wedge members in the circumferential direction to move an engagement position between the internal gear and the external gear in the circumferential direction, a pressing point via which the input member presses the wedge member, a radially inward contact point via which the wedge member is contactable with the first tubular portion, and a radially outward contact point via which the wedge member is contactable with the second tubular portion, in a state where a biasing force of the biasing member is largest because of a dimensional variation in manufacturing, a pressing force line passing through the pressing point via which the input member presses the wedge member is designed to be identical to an intermediate line between a first tangent line passing through the radially inward contact point and a second tangent line passing through the radially outward contact point.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
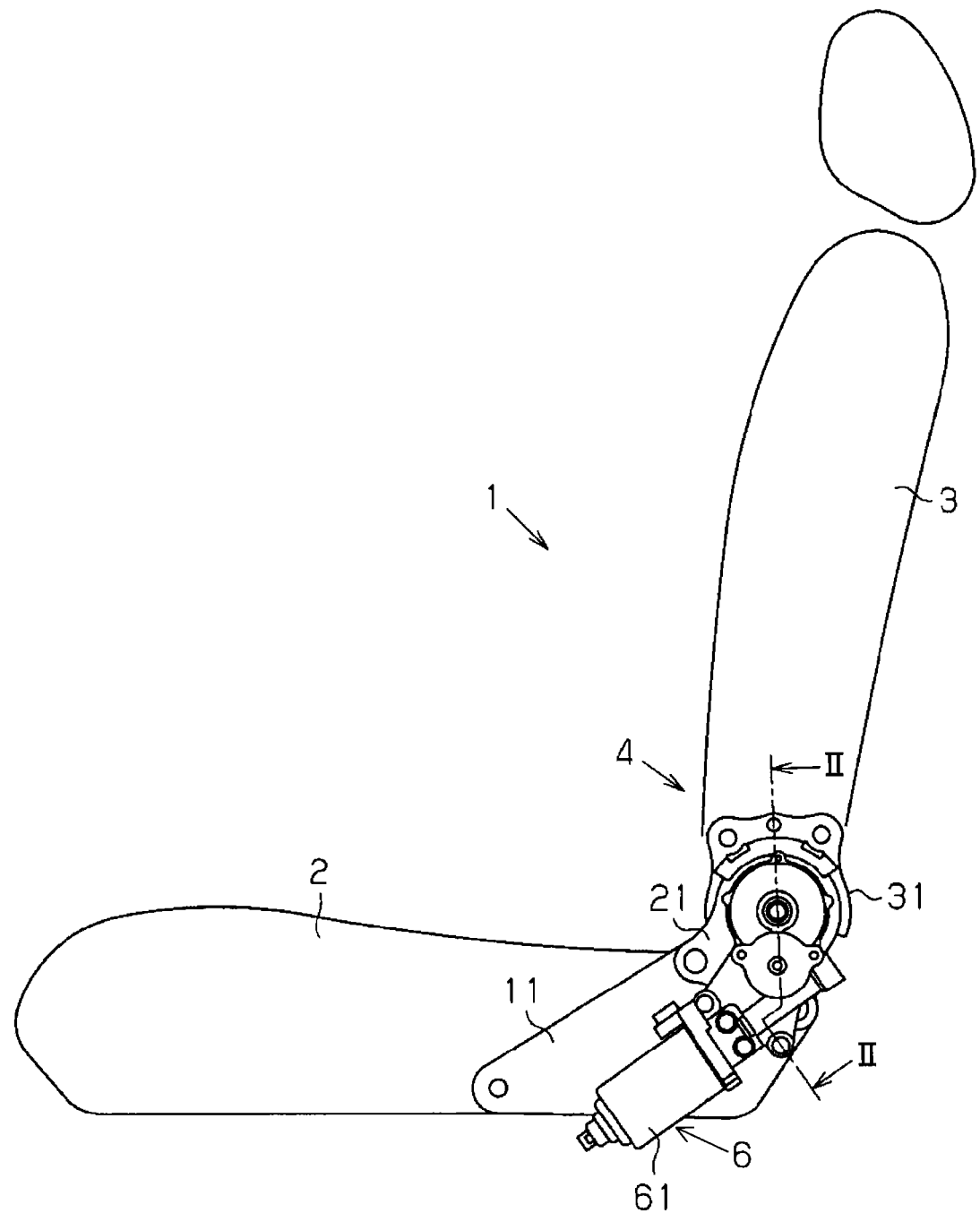
FIG. 1 is a side view of a vehicle seat to which a seat reclining apparatus according to an embodiment disclosed here is applied.
Figure 2:
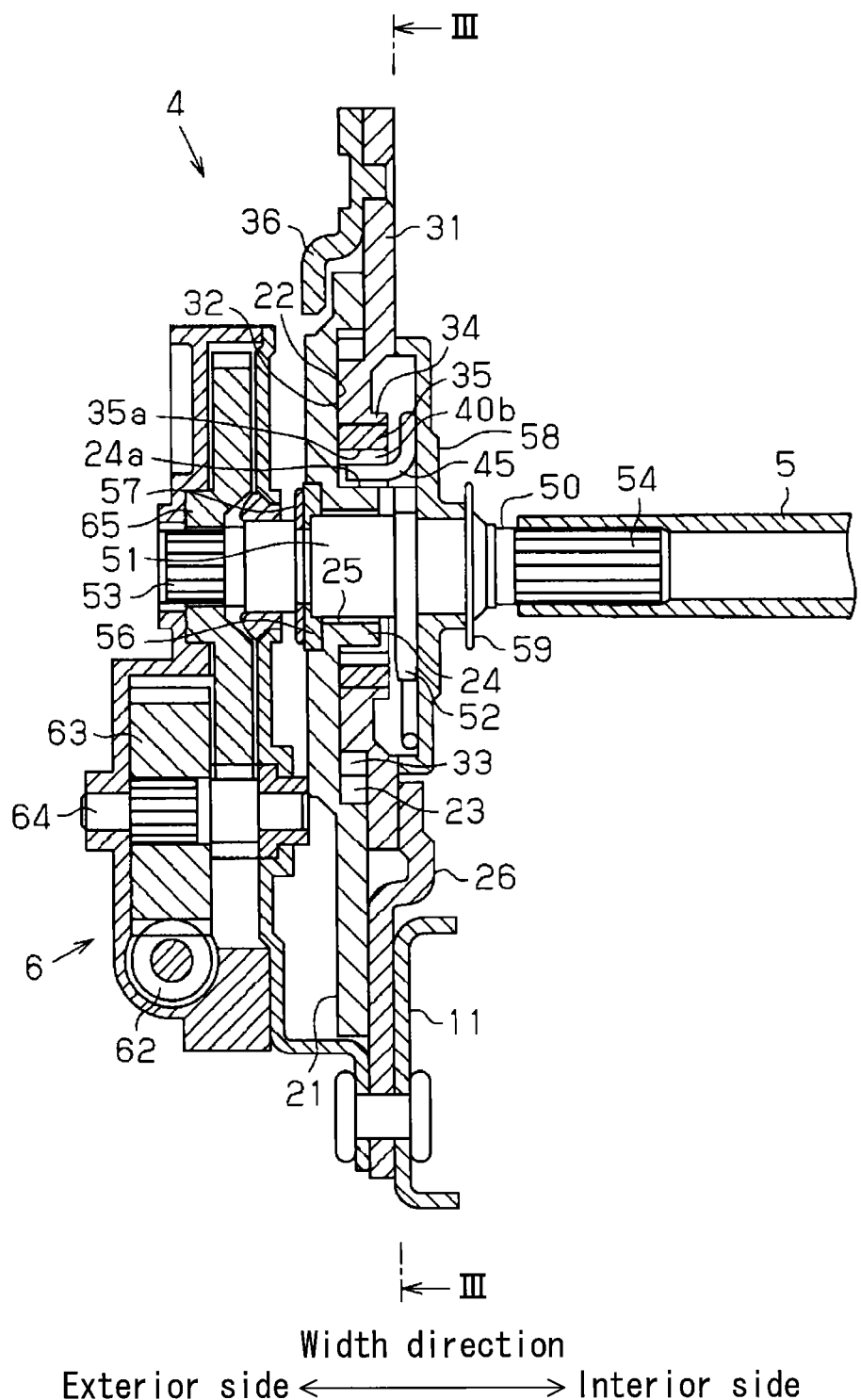
FIG. 2 is a cross sectional view taken along the line II-II of FIG. 1.

An embodiment of this disclosure will be described as follows with reference to FIGS. 1 to 6. As illustrated in FIG. 1, a vehicle seat 1 (which will be hereinafter simply referred to as a seat 1) adapted to be mounted on a vehicle includes a seat cushion 2 configuring a seat surface of the seat 1. A seat back 3 configuring a seat back portion is rotatably connected to a rear end of the seat cushion 2 so as to tilt relative to the seat cushion 2 via a seat reclining apparatus 4. A pair of seat reclining apparatuses 4 is arranged at both sides of the seat 1 in a width direction of the seat 1. The pair of seat reclining apparatuses 4 is connected to each other by a connecting shaft 5 extending in the width direction as illustrated in FIG. 2. The connecting shaft 5 is formed by a metallic pipe having a substantially cylindrical shape. One of the pair of seat reclining apparatuses 4 is connected to a drive unit 6 so as to be driven thereby. Accordingly, rotations of the seat reclining apparatus 4 driven by the drive unit 6 are transmitted by the connecting shaft 5 to the other of the pair of seat reclining apparatuses 4. Consequently, the seat reclining apparatuses 4 arranged at the both sides of the seat 1 in the width direction are driven in synchronization with each other.

As illustrated in FIG. 2, the seat reclining apparatus 4 includes a lower arm 11 fixed to a frame (seat cushion frame) of the seat cushion 2, and a lower plate 21 serving as a first member fixed to a side surface of the lower arm 11 in the width direction of the seat 1. The lower plate 21 is formed by a half blanking process for a metallic plate. The lower plate 21 includes a recessed portion 22 recessed from an interior side to an exterior side of the seat 1 in the width direction so as to have a substantially annular shape. An internal gear 23 is formed at the recessed portion 22. In addition, a boss portion 24 serving as a first tubular portion and having a cylindrical shape is formed in the center of the recessed portion 22. The boss portion 24 is positioned coaxially with the recessed portion 22 (with the internal gear 23) so as to protrude toward the interior side in the width direction. The boss portion 24 positioned at an inner circumferential side of the internal gear 23 is formed by a burring process. An inner circumferential surface of the boss portion 24 forms a shaft hole 25.

The seat reclining apparatus 4 further includes an upper plate 31 serving as a second member fixed to a frame (seat back frame) of the seat back 3. The upper plate 31 is formed by the half blanking process for a metallic plate. The upper plate 31 includes a convex portion 32 formed so as to protrude toward the exterior side (toward the lower plate 21) in the width direction and so as to have a substantially annular shape. The convex portion 32 has an outer diameter that is smaller than an inner diameter of the recessed portion 22. An external gear 33 is formed at the convex portion 32. A boss portion 34 having a cylindrical shape is formed in the center of the convex portion 32. The boss portion 34 is positioned coaxially with the convex portion 32 (with the external gear 33) so as to protrude toward the interior side in the width direction. The boss portion 34 is formed by the burring process. An annular bush 35 serving as a second tubular portion is press-fitted and fixed to an inner circumferential surface of the boss portion 34. The bush 35 has an outer diameter substantially equal to an inner diameter of the boss portion 34. An inner diameter of the bush 35 positioned at an inner circumferential side of the external gear 33 is designed to be larger than an outer diameter of the boss portion 24 of the lower plate 21 so that the boss portion 24 is inserted into the bush 35.

Figure 3:
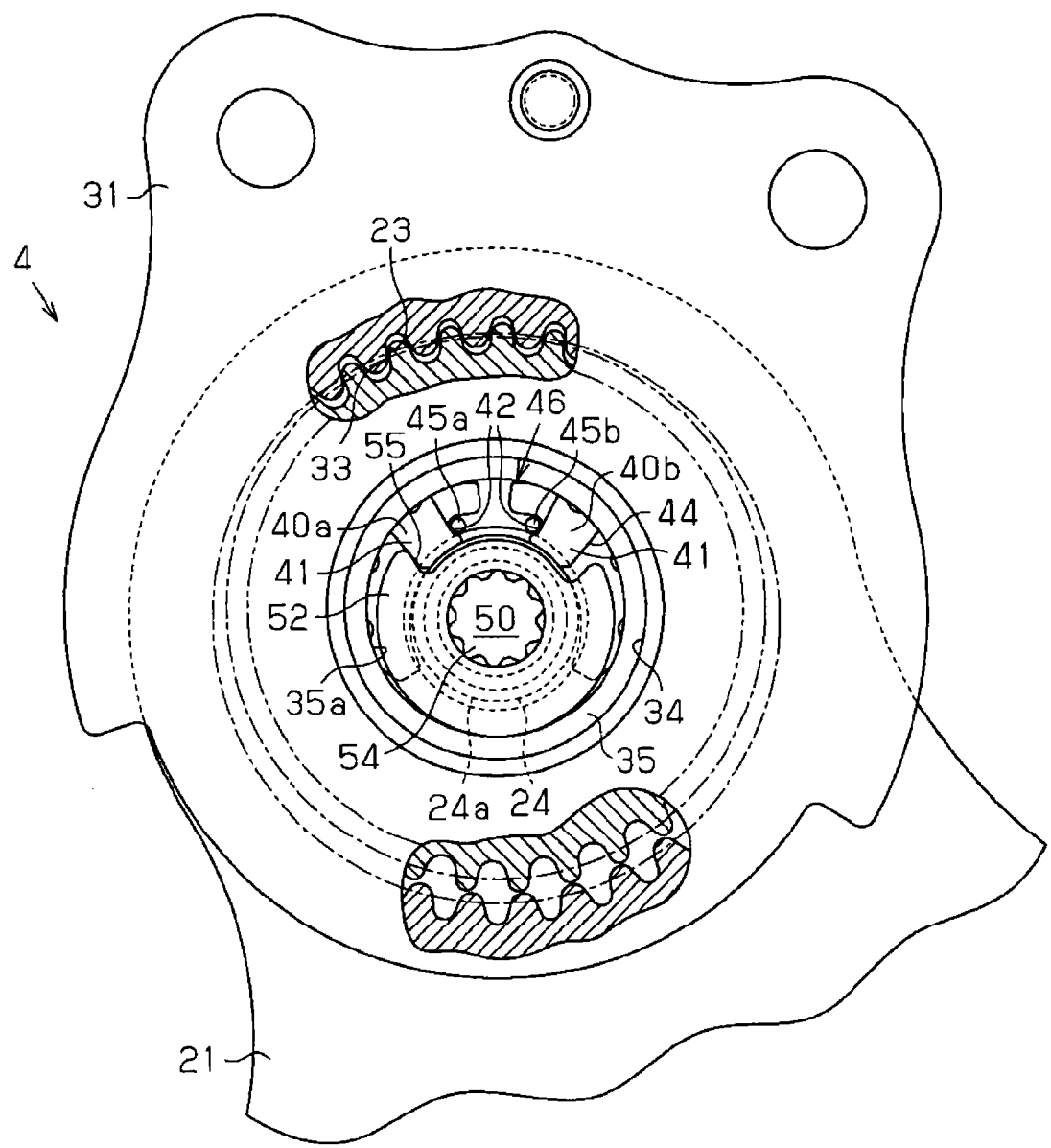
FIG. 3 is a cross sectional view taken along the line of FIG. 2.

Here, the number of teeth of the internal gear 23 is greater than the number of teeth of the external gear 33 by a predetermined number of teeth (one tooth in the embodiment). A profile of the teeth of the internal gear 23 is configured so as to engage with the external gear 33. As illustrated in FIG. 3, in a state where the internal gear 23 and the external gear 33 are engaged with each other, a central axis of the internal gear 23 and a central axis of the external gear 33 deviate from each other. Accordingly, an angular position where an eccentric engagement is established between the internal gear 23 and the external gear 33 (the angular position will be hereinafter simply referred to as an engagement position) gradually shifts in a circumferential direction of the lower plate 21 and the upper plate 31 as a drive shaft 50 rotates by 360 degrees. At this time, the upper plate 31 rotates relative to the lower plate 21 by an angle corresponding to a difference between the number of teeth of the external gear 33 and the number of teeth of the internal gear 23.

Figure 5:
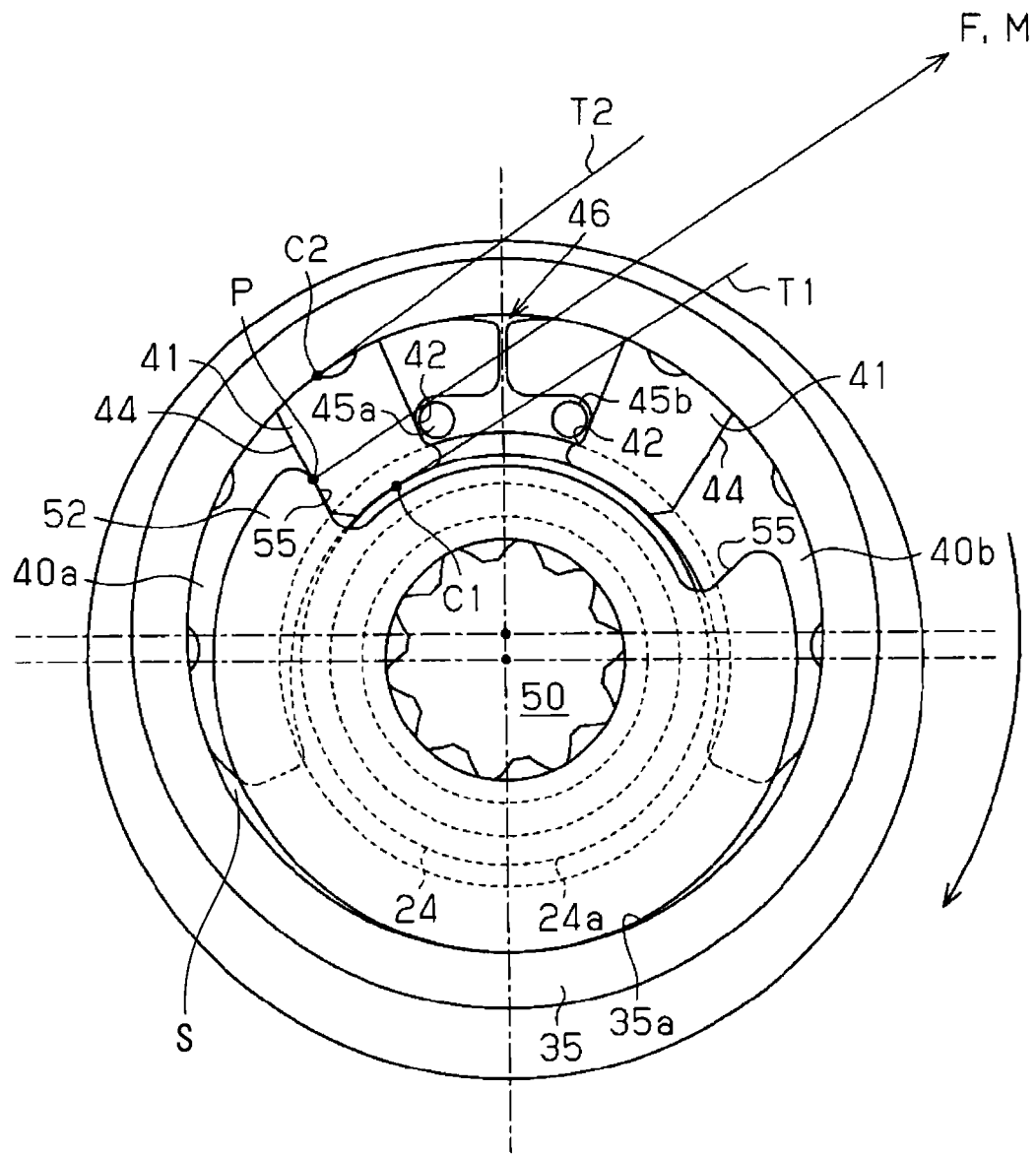
FIG. 5 is a front view illustrating a condition where one of wedge members is pressed by a cam portion of the seat reclining apparatus according to the embodiment when a load of a retaining spring for biasing the wedge members is largest because of dimensional variations in manufacturing.

As illustrated in FIG. 2, an outer circumferential surface 24a of the boss portion 24 faces an inner circumferential surface 35a of the bush 35 in a radial direction of a central axis of the drive shaft 50 under the state where the internal gear 23 and the external gear 33 are engaged with each other. In addition, as illustrated in FIG. 5, an accommodating chamber S having an annular shape is formed between the outer circumferential surface 24a of the boss portion 24 and the inner circumferential surface 35a of the bush 35 by the eccentric engagement between the internal gear 23 and the external gear 33. In particular, the accommodating chamber S has the longest radial distance relative to the central axis of the drive shaft 50 in a direction toward the engagement position between the internal gear 23 and the external gear 33. The accommodating chamber S has the shortest radial distance relative to the central axis of the drive shaft 50 in a direction toward an angular position circumferentially opposite from the engagement position between the internal gear 23 and the external gear 33.

As illustrated in FIG. 3, a pair of wedge members 40a and 40b is arranged in the accommodating chamber S. The pair of wedge members 40a and 40b is configured by two divided portions that are circumferentially arranged between the engagement position between the internal gear 23 and the external gear 33 and the angular position circumferentially opposite from the engagement position. The wedge members 40a and 40b are formed into nearly arc shapes that are symmetric to each other so as to conform to the accommodating chamber S. Each of the wedge members 40a and 40b has first and second end portions in a circumferential direction of each of the wedge members 40a and 40b. The first and second and portions are circumferentially located adjacent to the engagement position between the internal gear 23 and the external gear 33 and at the angular position circumferentially opposite from the engagement position. A thickness of each of the wedge members 40a and 40b in the radial direction of the central axis of the drive shaft 50 gradually increases from the second end portion to the first end portion along the circumferential direction. Further, a thickness of each of the wedge members 40a and 40b in the direction of the central axis of the drive shaft 50 is designed to be substantially equal to thicknesses of the boss portion 24 (the internal gear 23) and the bush 35 (the external gear 33) in the direction of the central axis of the drive shaft 50. A protruding portion 41 protruding toward the interior side in the width direction is formed at an intermediate portion of each of the wedge members 40a and 40b in the circumferential direction (the protruding portion 41 protrudes along the central axis of the drive shaft 50, that is, the protruding portion 41 extends in a direction perpendicular to a horizontal surface of FIG. 3). The intermediate portion of each of the wedge members 40a and 40b is positioned adjacent to the engagement position between the internal gear 23 and the external gear 33. The protruding portion 41 formed as described above extends from ends of the boss portion 24 and the bush 35 toward the interior side in the width direction. In addition, a corner portion at an inner circumferential side of each of the wedge members 40a and 40b is cut out from the first end portion to the protruding portion 41, thereby forming a lock portion 42.

Figure 4:
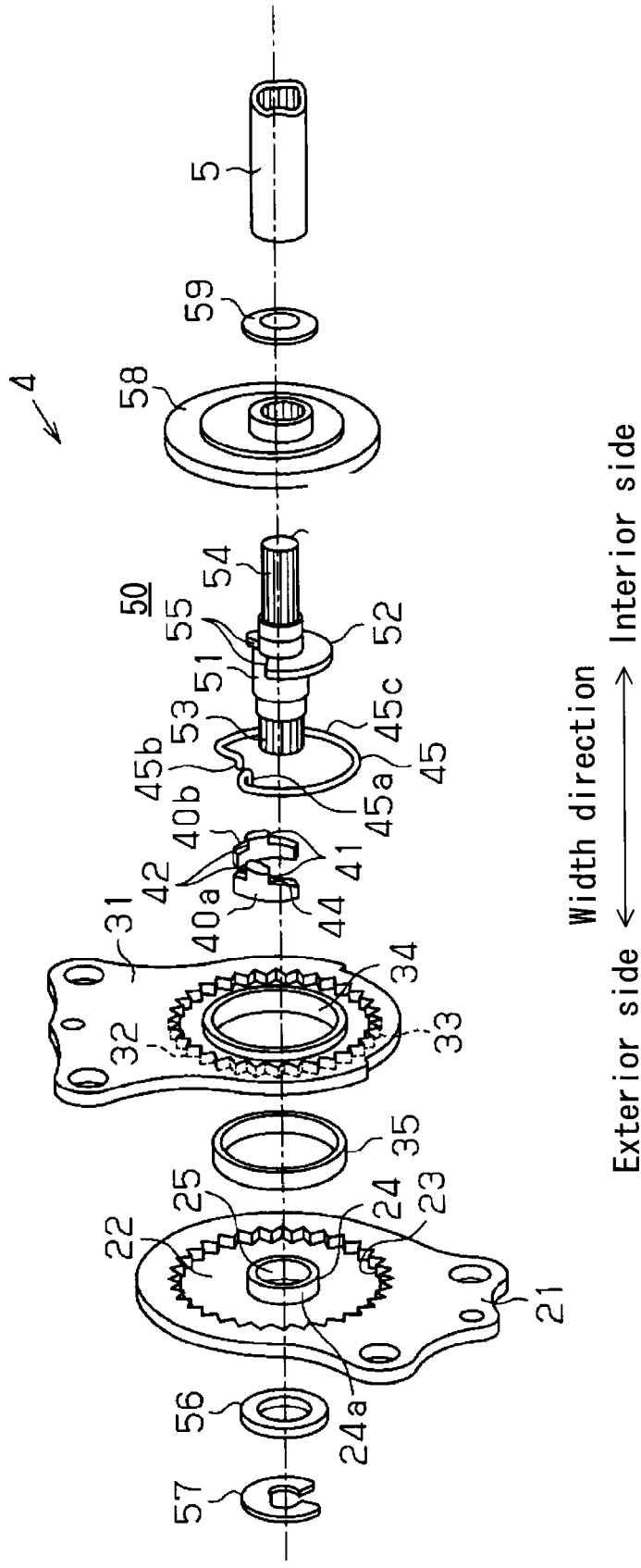
FIG. 4 is a schematic perspective view of the seat reclining apparatus according to the embodiment.

As illustrated in FIG. 4, the wedge members 40a and 40b are biased by a retaining spring 45 (serving as a biasing member) in a direction to separate the wedge members 40a and 40b from each other in the circumferential direction. That is, the wedge members 40a and 40b are biased by the retaining spring 45 in a direction to increase the eccentricity between the internal gear 23 and the external gear 33. In particular, the retaining spring 45 includes a spring portion 45c and first and second ends 45a and 45b. The spring portion 45c having a substantially arc shape is arranged at an interior side of the upper plate 31 in the width direction and is provided at an outer circumferential side of the wedge members 40a and 40b. Both ends of the spring portion 45c are bent toward a direction parallel to the direction of the central axis of the drive shaft 50; thereby, the first and second ends 45a and 45b are formed. Thus, the retaining spring 45 is formed into an omega-shape. The first and second ends 45a and 45b are locked by the lock portions 42 of the wedge members 40a and 40b; thereby, the wedge members 40a and 40b are biased by the retaining spring 45 in the direction to increase the eccentricity between the internal gear 23 and the external gear 33. Therefore, the engagement position between the internal gear 23 and the external gear 33 is retained by the wedge members 40a and 40b. That is, the seat reclining apparatus 4 retains a rotational angle of the upper plate 31 relative to the lower plate 21 by a frictional force of the pair of wedge members 40a and 40b and by the biasing force of the retaining spring 45.

The drive shaft 50 serving as an input member extending in the width direction (along the central axis) is inserted into the shaft hole 25 of the lower plate 21 so as to be coaxially supported by the shaft hole 25. The drive shaft 50 includes a shaft portion 51 having a cylindrical shape. The shaft portion 51 is arranged at an intermediate portion of the drive shaft 50 in the direction of the central axis (in the width direction). The drive shaft 50 is rotationally supported via the shaft portion 51 by the shaft hole 25.

As illustrated in FIG. 4, the drive shaft 50 further includes a cam portion 52 positioned adjacent to the shaft portion 51 and arranged at an interior side of the shaft portion 51 in the width direction. The cam portion 52 has a circular arc shape. An annular plate having an outer diameter larger than the inner diameter of the bush 35 is partially cut out so as to have a radially opened portion; thereby, the cam portion 52 is formed. The second end portions of the wedge members 40a and 40b have axial end surfaces facing the cam portion 52. The cam portion 52 facing the wedge members 40a and 40b in the width direction covers the axial end surfaces of the second end portions of the wedge members 40a and 40b excluding the protruding portions 41. A thickness of each of the second end portions of the wedge members 40a and 40b in the radial direction of the central axis of the drive shaft 50 is smaller than the thickness of each of the first end portions of the wedge members 40a and 40b in the radial direction of the central axis of the drive shaft 50. End surfaces (first contact surfaces) of the cam portion 52 in a circumferential direction of the cam portion 52 form pressing surfaces 55 contactable with the protruding portions 41 of the wedge members 40a and 40b. End surfaces (second contact surfaces) of the protruding portions 41 in the circumferential direction correspond to pressure receiving surfaces 44. For example, the cam portion 52 (the drive shaft 50) rotates; therefore, one of the pressure receiving surfaces 44 is pressed by the pressing surfaces 55 facing the pressure receiving surface 44 in a rotating direction of the cam portion 52. At this time, the wedge members 40a and 40b integrally rotate with the drive shaft 50 while reducing a clearance 46 defined between the first end portions (being thicker than the second end portions in the radial direction of the central axis of the drive shaft 50) of the wedge members 40a and 40b against the biasing force of the retaining spring 45 (see FIG. 3). Alternatively, the wedge members 40a and 40b integrally rotate with the drive shaft 50 while keeping the first end portions in contact with each other. At this time, the upper plate 31 is rotated by the rotation of the wedge members 40a and 40b in a state where the engaged state between the internal gear 23 and the external gear 33 is maintained; thereby, the rotating speed of the drive shaft 50 is reduced. In other words, as the drive shaft 50 rotates by 360 degrees, the upper plate 31 rotates relative to the lower plate 21 by the angle corresponding to the difference between the number of teeth of the external gear 33 and the number of teeth of the internal gear 23. In addition, as illustrated in FIG. 4, the drive shaft 50 includes serration shaft portions 53 and 54 arranged at axial ends located at the exterior side and the interior side, respectively, in the width direction. The serration shaft portion 54 is fitted to each of axial ends of the connecting shaft 5 extending in the width direction.

As illustrated in FIG. 2, the shaft portion 51 includes first and second axial ends fixed to the lower plate 21 and the upper plate 31, respectively, in the width direction (in the direction of the central axis of the drive shaft 50). The first axial end of the shaft portion 51 is locked via a washer 56 by a retaining ring 57 to the lower plate 21 in the direction of the central axis. The retaining ring 57 is formed by a metallic plate. The second axial end of the shaft portion 51 is locked via a cover 58 by a retaining ring 59 to the upper plate 31 in the direction of the central axis. The cover 58 presses the retaining spring 45 and the retaining ring 59 is formed by a metallic plate. As described above, the drive shaft 50 is positioned by the retaining rings 57 and 59 therebetween in the direction of the central axis of the drive shaft 50. Moreover, presser plates 26 and 36 are sandwiched between mating members (the lower plate 21 and the upper plate 31) of the presser plates 26 and 36 and are attached to the mating members so as to restrict the engaged state between the internal gear 23 and the external gear 33 from shifting in the direction of the central axis of the drive shaft 50.

The drive unit 6 is fixed to the lower arm 11. The drive unit 6 includes an electric motor 61 serving as a drive source (see FIG. 1), a worm 62 fixed to a rotational shaft of the electric motor 61 (see FIG. 2), a worm wheel 63 engaging with the worm 62, a pinion 64 integrally rotating with the worm wheel 63, and a transmission gear 65 engaging with the pinion 64 and fitted to the serration shaft portion 53 of the drive shaft 50. For example, the electric motor 61 is brought into operation in a forward or backward direction by an operation of an operation switch; thereby, rotations of the worm 62 are transmitted through the worm wheel 63, the pinion 64, and the transmission gear 65 to the drive shaft 50 connected to the electric motor 61. Therefore, the drive shaft 50 rotates about the shaft hole 25 of the lower plate 21. In addition, the rotations of the drive shaft 50 connected to the electric motor 61 are transmitted by the connecting shaft 5 to the drive shaft 50 arranged at the opposite side of the drive shaft 50 connected to the electric motor 61 in the width direction. Accordingly, the drive shafts 50 arranged at the both sides of the seat 1 in the width direction rotate about the shaft holes 25 of the lower plate 21 in synchronization with each other. Consequently, as the drive shafts 50 rotate by 360 degrees in synchronization with each other, the upper plate 31 rotates relative to the lower plate 21 by the angle corresponding to the difference between the number of teeth of the external gear 33 and the number of teeth of the internal gear 23.

Next, a state where the pressure receiving surface 44 of the protruding portion 41 (of each of the wedge members 40a and 40b) is pressed by each of the pressing surfaces 55 of the cam portion 52 (the drive shaft 50) will be described as follows. For example, the pressure receiving surface 44 of the protruding portion 41 of one of the wedge members 40a and 40b (here, the wedge member 40a) is pressed via a pressing point P by the pressing surface 55 of the cam portion 52 in accordance with the rotation of the cam portion 52 in a clockwise direction seen in each of FIGS. 5 and 6. In particular, a radially outward end of the pressing surface 55 is curved as illustrated in an enlarged view of FIG. 6. On the other hand, the pressure receiving surface 44 is formed of an entirely linear shape. Further, a contact point between the pressing surface 55 and the pressure receiving surface 44 corresponds to the pressing point P via which the pressing surface 55 is contactable with the pressure receiving surface 44. As illustrated in FIG. 5, a direction of a normal line being perpendicular to the pressure receiving surface 44 and passing through the pressing point P corresponds to a direction F in which a rotating force of the cam portion 52 substantially acts on the wedge member 40a. The direction F is indicated by a pressing force line F. In addition, the wedge member 40a functioning as a wedge is contactable via contact points with the outer circumferential surface 24a of the boss portion 24 and with the inner circumferential surface 35a of the bush 35 in accordance with the rotation of the cam portion 52. The contact points of the wedge member 40a relative to the outer circumferential surface 24a and the inner circumferential surface 35a are indicated by radially inward and outward contact points C1 and C2, respectively. Moreover, a line passing through the radially inward contact point C1 and being tangent to the outer circumferential surface 24a is indicated by a first tangent line T1 and a line passing through the radially outward contact point C2 and being tangent to the inner circumferential surface 35a is indicated by a second tangent line 72.

Here, the seat reclining apparatus 4 is assembled in a condition of FIG. 5 because of dimensional variations in manufacturing. In particular, when the seat reclining apparatus 4 is in the assembled state where the clearance 46 between the first end portions of the wedge members 40a and 40b is smallest, the retaining spring 45 is compressed to the maximum by biasing forces of the wedge members 40a and 40b. At this time, a load of the retaining spring 45 for biasing the wedge members 40a and 40b is largest. In addition, an initial driving force of the drive shaft 50 for rotating or sliding the wedge members 40a and 40b is largest. In such case, the pressing force line F is designed to be arranged between the radially inward contact point C1 and the radially outward contact point C2 and to be identical to an intermediate line M between the first tangent line T1 and the second tangent line T2. The intermediate line M is a straight line passing through an intersection point between the first tangent line T1 and the second tangent line 72.

Figure 6:
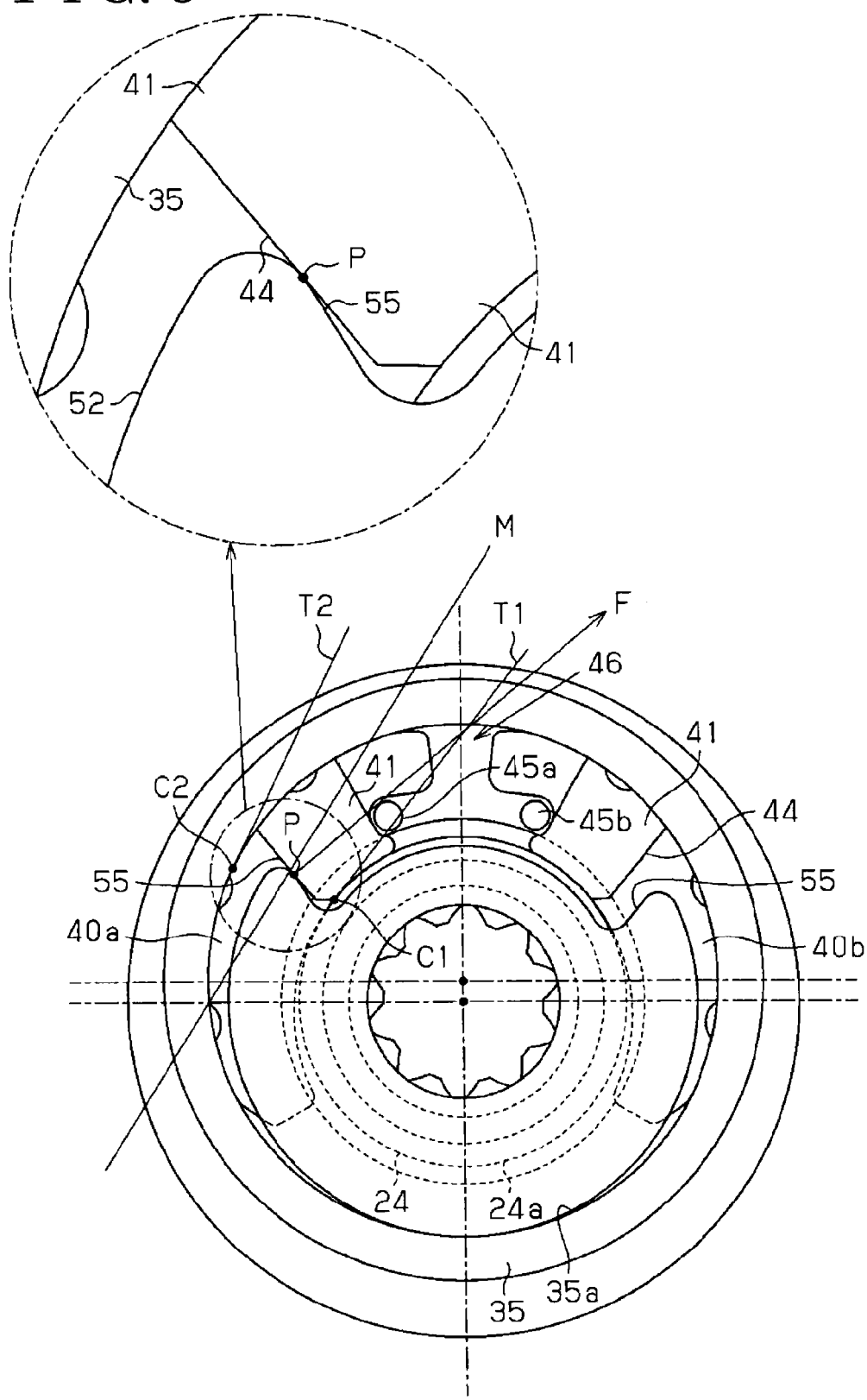
FIG. 6 is a front view illustrating a condition where one of the wedge members is pressed by the cam portion of the seat reclining apparatus according to the embodiment when the load of the retaining spring for biasing the wedge members is smallest because of dimensional variations in manufacturing.

Meanwhile, the seat reclining apparatus 4 is in an assembled condition of FIG. 6 because of dimensional variations in manufacturing. In particular, when the seat reclining apparatus 4 is in the assembled state where the clearance 46 between the first end portions of the wedge members 40a and 40b is largest, the retaining spring 45 is compressed to the minimum by the biasing forces of the wedge members 40a and 40b. At this time, the load of the retaining spring 45 for biasing the wedge members 40a and 40b is smallest. In addition, the initial driving force of the drive shaft 50 for rotating or sliding the wedge members 40a and 40b is smallest. In such case, the pressing force line F is inclined to an inward side in the radial direction of the central axis of the cam portion 52 (the drive shaft 50) with respect to the intermediate line M between the first tangent line T1 and the second tangent line T2. In other words, as compared to the condition of FIG. 5 where the pressing force line F is identical to the intermediate line M between the first tangent line T1 and the second tangent line T2, the pressing force line F passing through the pressing point P is designed to be inclined to the inward side in the radial direction of the central axis of the cam portion 52 in a case where the dimensional variations in manufacturing occur as in FIG. 6.

Moreover, according to the seat reclining apparatus 4 of the embodiment, in the condition where the initial driving force of the drive shaft 50 for rotating the wedge members 40a and 40b is largest as shown in FIG. 5, the pressing surface 55 of the cam portion 52 is designed to press the pressure receiving surface 44 of the protruding portion 41 in a surface contact manner. For example, when the initial driving force of the drive shaft 50 for rotating the wedge members 40a and 40b is largest because of the dimensional variations in manufacturing, i.e., when the highest strength is required for the cam portion 52 or for each of the wedge members 40a and 40b, the pressing surface 55 and the pressure receiving surface 44 designed as described above are entirely brought into contact with each other; thereby, a load may be substantially equally received by both the pressing surface 55 and the pressure receiving surface 44. In such case, a contact point obtained right before the pressing surface 55 and the pressure receiving surface 44 are entirely brought into contact with each other may be defined as the pressing point P.

Next, an operation of the seat reclining apparatus 4 of the embodiment will be described as follows. Firstly, in a condition where the operation of the drive shafts 50 arranged at the both sides of the seat 1 in the width direction is stopped, the wedge members 40a and 40b are biased by the retaining spring 45 in the direction to separate the wedge members 40a and 40b from each other in the circumferential direction, that is, the wedge members 40a and 40b are biased by the retaining spring 45 in the direction to increase the eccentricity between the internal gear 23 and the external gear 33. Consequently, the engagement position between the internal gear 23 and the external gear 33 is retained; thereby, the rotational angle of the upper plate 31 relative to the lower plate 21 is maintained to therefore maintain the seat back 3 to a predetermined inclined angle.

Meanwhile, for example, the drive shafts 50 arranged at the both sides of the seat 1 in the width direction are driven by the drive unit 6; therefore, the pressure receiving surface 44 (the protruding portion 41) of one of the wedge members 40a and 40b is pressed by the pressing surface 55 of the cam portion 52 depending on the rotating directions of the drive shafts 50. Thereafter, the wedge members 40a and 40b integrally rotate with the cam portion 52 while reducing the clearance 46 between the first end portions of the wedge members 40a and 40b or while keeping the first end portions in contact with each other. Consequently, as the drive shaft 50 rotates by 360 degrees, the upper plate 31 rotates relative to the lower plate 21 by the angle corresponding to the difference between the number of teeth of the external gear 33 and the number of teeth of the internal gear 23; therefore, the seat back 3 is tiled relative to the seat cushion 2.

In the case of tilting the seat back 3 relative to the seat cushion 2, especially, the initial driving force of the drive shaft 50 for rotating the wedge members 40a and 40b is largest because of the dimensional variations in manufacturing. In such case, the pressing force line F is designed to be identical to the intermediate line M between the first tangent line T1 and the second tangent line T2 in the seat reclining apparatus 4 of the embodiment. Accordingly, when the wedge member 40a or 40b is pressed by the cam portion 52 (the drive shaft 50) so as to rotate in a direction from a small clearance portion to a large clearance portion of the accommodating chamber S, friction resistance of the wedge member 40a or 40b may be reduced. In addition, the wedge member 40a or 40b may be avoided from being partially worn by an axial component of offset load applied via the protruding portion 41 to the wedge member 40a or 40b.

Moreover, according to the seat reclining apparatus 4 of the embodiment, the pressing point P via which the wedge member 40a or 40b is pressed by the drive shaft 50 is arranged at the protruding portion 41. Therefore, the pressing point P may be positioned close to the radially inward contact point C1 and the radially outward contact point C2, compared to a case where the pressing point P is arranged at the second end portion of the wedge member 40a or 40b (the second end portions being located circumferentially opposite from the first end portions circumferentially facing each other).

As described above, following effects may be obtained from the seat reclining apparatus 4 according to the embodiment. According to the embodiment, the pressing force line F is designed to be identical to the intermediate line M between the first tangent line T1 and the second tangent line T2 under the condition where the load of the retaining spring 45 for biasing the wedge members 40a and 40b is largest because of the dimensional variations in manufacturing. Therefore, for example, when the wedge member 40a or 40b is pressed by the drive shaft 50 so as to rotate in the direction from the small clearance portion to the large clearance portion of the accommodating chamber S, the friction resistance of the wedge member 40a or 40b may be minimized and the driving force of the drive shaft 50 for rotating the wedge members 40a and 40b may be reduced. In addition, the wedge member 40a or 40b may be restricted from being partially worn by the axial component of offset load applied to the wedge member 40a or 40b and the strength of the wedge member 40a or 40b may be increased. In other words, according to the configuration of the seat reclining apparatus 4 of the embodiment, the wedge member 40a or 40b may be restricted from being partially worn by the axial component of offset load while surely securing a circumferential length of a contact surface of the outer circumferential side of the wedge member 40a or 40b relative to the inner circumferential surface 35a to thereby maintain the strength (the contact surface corresponds to a load receiving surface receiving a load when the drive shaft 50 is brought into contact with the wedge member 40a or 40b).

Moreover, according to the seat reclining apparatus 4 of the embodiment, the pressing point P via which the wedge member 40a or 40b is pressed by the drive shaft 50 is arranged at the protruding portion 41. Therefore, the pressing point P may be positioned close to the radially inward contact point C1 and the radially outward contact point C2, compared to a case where the pressing point P is arranged at the second end portion of the wedge member 40a or 40b (the second end portions being located circumferentially opposite from the first end portions circumferentially facing each other). Accordingly, for example, even in a case where the radially inward contact point C1 or the radially outward contact point C2 is inaccurately positioned because of dimensional or positional errors of the accommodating chamber S due to dimensional variations in manufacturing of the lower plate 21 or the upper plate 31 or even in a case where the pressing force line F is inaccurately positioned because of dimensional variations in manufacturing of the wedge member 40a or 40b, the pressing force line F may be surely positioned between the radially inward contact point C1 and the radially outward contact point C2. In addition, manufacturing accuracy required for the lower plate 21, the upper plate 31, the wedge members 40a and 40b, and the like may be minimized.

According to the seat reclining apparatus 4 of the embodiment, the pressing force line F passing through the pressing point P is designed to be inclined toward the inward side relative to the intermediate line M in the radial direction of the central axis of the drive shaft 50 in a case where the dimensional variations in manufacturing occur. Therefore, the contact surface of the outer circumferential side of the wedge member 40a or 40b relative to the inner circumferential surface 35a may easily separate from the inner circumferential surface 35a. As a result, the driving force of the drive shaft 50 for rotating the wedge members 40a and 40b may be reduced.

According to the seat reclining apparatus 4 of the embodiment, for example, the load of the retaining spring 45 for biasing the wedge members 40a and 40b is largest because of the dimensional variations in manufacturing and the initial driving force of the drive shaft 50 for rotating the wedge members 40a and 40b is therefore largest. At this time, the drive shaft 50 (the pressing surface 55) and the wedge member 40a or 40b (the pressure receiving surface 44) are entirely brought into contact with each other; thereby, a load may be substantially equally received by both the drive shaft 50 and the wedge member 40a or 40b. Therefore, wear of contact portions of the wedge member 40a or 40b relative to the drive shaft 50 may be minimized. As a result, the strength of the drive shaft 50 or the wedge member 40a or 40b may be increased.

Figure 7:
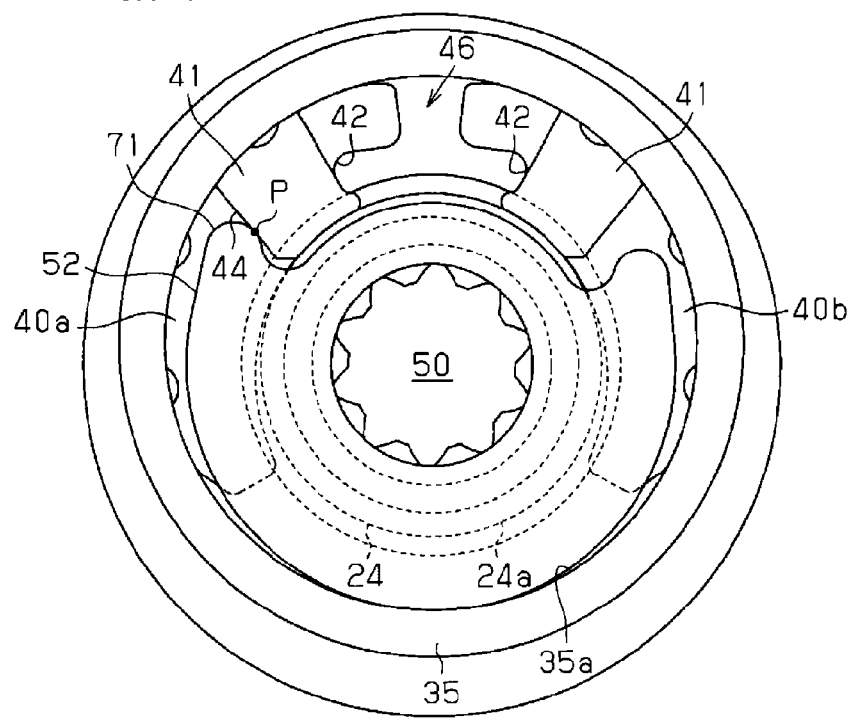
FIG. 7 is a front view illustrating a condition where one of the wedge members is pressed by the cam portion of the seat reclining apparatus according to a first modified example of the embodiment.

In addition, the seat reclining apparatus 4 of the embodiment may be modified as follows. As illustrated in FIG. 7 showing the seat reclining apparatus 4 of a first modified example of the embodiment, a pressing surface 71 (the first contact surface) having a circular arc shape may be formed at the cam portion 52 (the drive shaft 50) so as to make contact via a contact point with the pressure receiving surface 44 of the protruding portion 41 of each of the wedge members 40a and 40b regardless of the dimensional variations in manufacturing.

Figure 8:
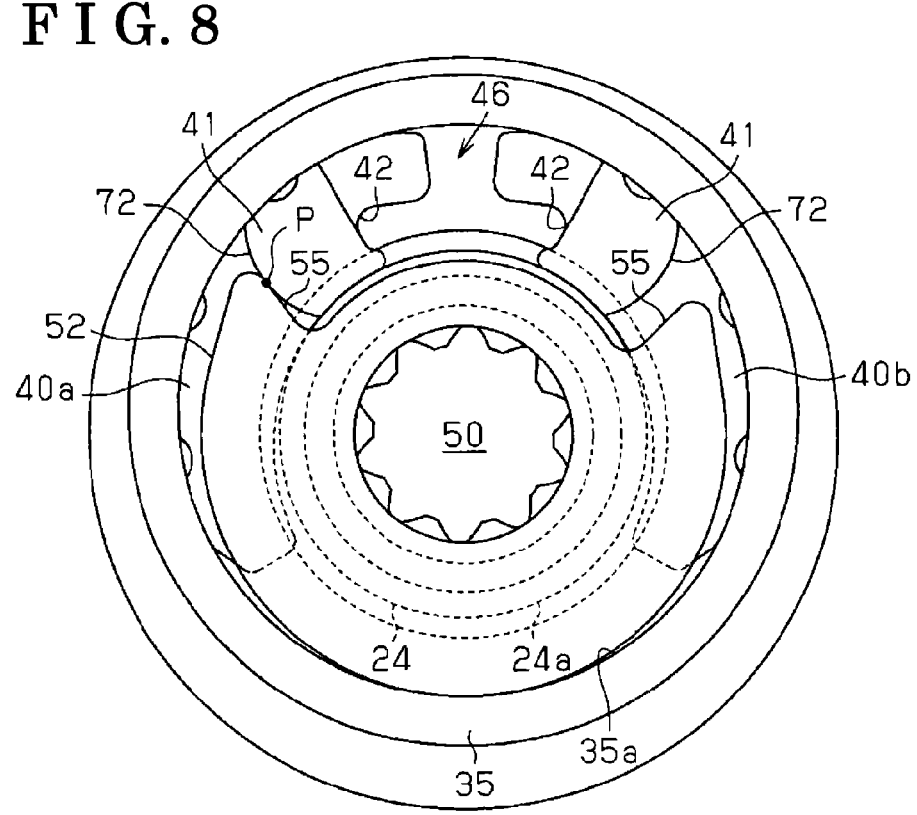
FIG. 8 is a front view illustrating a condition where one of the wedge members is pressed by the cam portion of the seat reclining apparatus according to a second modified example of the embodiment disclosed here.

Alternatively, as illustrated in FIG. 8 showing the seat reclining apparatus 4 of a second modified example of the embodiment, a pressure receiving surface 72 (the second contact surface) having a circular arc shape may be formed at the protruding portion 41 (of each of the wedge members 40a and 40b) so as to make contact via a contact point with the pressing surface 55 of the cam portion 52 (the drive shaft 50) regardless of the dimensional variations in manufacturing. In such case, the pressing force line F may be indicated by a normal line being perpendicular to the pressing surface 55 and passing through the pressing point P.

Under the case illustrated in each of FIGS. 7 and 8, even when the dimensional variations in manufacturing occur, the cam portion 52 (the drive shaft 50) is surely contactable via the contact point with the wedge member 40a or 40b. Therefore, position errors of the pressing point P or orientation errors of the pressing force line F may be minimized.

In the seat reclining apparatus 4 according to the embodiment, the intermediate line M may be a line bisecting an acute angle formed by the first tangent line T1 and the second tangent line T2. In such case, when the wedge member 40a or 40b is pressed by the drive shaft 50 so as to rotate in the direction from the small clearance portion to the large clearance portion of the accommodating chamber S, the friction resistance of the wedge member 40a or 40b may be reduced approximately to the minimum. In addition, the driving force of the drive shaft 50 for rotating the wedge members 40a and 40b may be reduced approximately to the minimum.

According to the seat reclining apparatus 4 of the embodiment, the pressing point P via which the cam portion 52 (the drive shaft 50) presses the protruding portion 41 (of each of the wedge members 40a and 40b) may be positioned at an outward side relative to an intermediate position in a radial direction of the protruding portion 41.

According to the seat reclining apparatus 4 of the embodiment, the bush 35 may be integrally formed with the upper plate 31. Moreover, according to the seat reclining apparatus 4 of the embodiment, the number of teeth of the internal gear 23 is larger by two or more than the number of teeth of the external gear 33.

According to the seat reclining apparatus 4 of the embodiment, the drive shaft 50 may be manually operated according to circumstances. In addition, according to the seat reclining apparatus 4 of the embodiment, the lower plate 21 is arranged at the seat cushion 2 while the upper plate 31 is arranged at the seat back 3. Alternatively, the lower plate 21 may be arranged at the seat back 3 while the upper plate 31 may be arranged at the seat cushion 2.

Moreover, according to seat reclining apparatus 4 of the embodiment, one of the first contact surface (pressing surface) 55 and the second contact surface (pressure receiving surface) 44 of the drive shaft 50 and the wedge member 40a or 40b is designed to have a linear shape. The other of the first contact surface (pressing surface) 71 and the second contact surface (pressure receiving surface) 72 of the drive shaft 50 and the wedge member 40a or 40b is designed to have a circular arc shape.

As described above, according to the aforementioned embodiment, the seat reclining apparatus 4 includes the lower plate 21 adapted to be attached to one of the seat cushion 2 and the seat back 3 and including the internal gear 23 and the boss portion 24 positioned coaxially with the internal gear 23 and arranged at the inner circumferential side of the internal gear 23, the upper plate 31 adapted to be attached to the other of the seat cushion 2 and the seat back 3 and including the external gear 33 and the bush 35 into which the boss portion 24 is inserted, the external gear 33 having the teeth fewer than the teeth of the internal gear 23 and engaging with the internal gear 23, the bush 35 being positioned coaxially with the external gear 33 and arranged at the inner circumferential side of the external gear 33, the pair of wedge members 40a and 40b arranged in the annular accommodating chamber S formed between the outer circumferential surface 24a of the boss portion 24 and the inner circumferential surface 35a of the bush 35, each of the wedge members 40a and 40b including the protruding portion 41 axially protruding from the accommodating chamber S, the retaining spring 45 biasing the pair of wedge members 40a and 40b in the direction to separate the pair of wedge members 40a and 40b from each other in the circumferential direction of the pair of wedge members 40a and 40b, the drive shaft 50 having the central axis coaxial with the boss portion 24, the drive shaft 50 rotating to press the protruding portion 41 along the circumferential direction to rotate the pair of wedge members 40a and 40b in the circumferential direction to move the engagement position between the internal gear 23 and the external gear 33 in the circumferential direction, the pressing point P via which the drive shaft 50 presses the wedge member 40a or 40b, the radially inward contact point C1 via which the wedge member 40a or 40b is contactable with the boss portion 24, and the radially outward contact point C2 via which the wedge member 40a or 40b is contactable with the bush 35. In a state where the biasing force of the retaining spring 45 is largest because of the dimensional variations in manufacturing, the pressing force line F passing through the pressing point P via which the drive shaft 50 presses the wedge member 40a or 40b is designed to be identical to the intermediate line M between the first tangent line T1 passing through the radially inward contact point C1 and the second tangent line T2 passing through the radially outward contact point C2.

According to the aforementioned configuration of the seat reclining apparatus 4 of the embodiment, the pressing force line F is designed to be identical to the intermediate line M between the first tangent line T1 and the second tangent line T2. As a result, for example, when the wedge member 40a or 40b is pressed by the drive shaft 50 so as to rotate in the direction from the small clearance portion to the large clearance portion of the accommodating chamber S, the friction resistance of the wedge member 40a or 40b may be minimized and the driving force of the drive shaft 50 for rotating the wedge members 40a and 40b may be reduced. In addition, the wedge member 40a or 40b may be restricted from being partially worn by the axial component of offset load applied to the wedge member 40a or 40b and the strength of the wedge member 40a or 40b may be increased.

Moreover, according to the aforementioned configuration of the seat reclining apparatus 4 of the embodiment, the pressing point P via which the wedge member 40a or 40b is pressed by the drive shaft 50 is arranged at the protruding portion 41. Therefore, the pressing point P may be positioned close to the radially inward contact point C1 and the radially outward contact point C2, compared to a case where the pressing point P is arranged at the second end portion of the wedge member 40a or 40b (the second end portions being located circumferentially opposite from the first end portions circumferentially facing each other). Accordingly, for example, even in a case where the radially inward contact point C1 or the radially outward contact point C2 is inaccurately positioned because of the dimensional or positional errors of the accommodating chamber S due to the dimensional variations in manufacturing of the lower plate 21 or the upper plate 31 or even in a case where the pressing force line F is inaccurately positioned because of the dimensional variations in manufacturing of the wedge member 40a or 40b, the pressing force line F may be surely positioned between the radially inward contact point C1 and the radially outward contact point C2.

Additionally, the pressing force line F is defined as the normal line perpendicular to the pressing surface 55 of the drive shaft 50 pressing the wedge member 40a or 40b or the normal line perpendicular to the pressure receiving surface 44 of the wedge member 40a or 40b pressed by the drive shaft 50. Meanwhile, the intermediate line M is arranged between the radially inward contact point C1 and the radially outward contact point C2 and is defined as the straight line passing through the intersection point between the first tangent line T1 passing through the radially inward contact point C1 and the second tangent line T2 passing through the radially outward contact point C2.

According to the aforementioned embodiment, in a case where the dimensional variations in manufacturing occur, the pressing force line F passing through the pressing point P is designed to be inclined toward the inward side relative to the intermediate line M in the radial direction of the central axis of the drive shaft 50.

A length of the contact surface of the outer circumferential side of the wedge member 40a or 40b in the radial direction of the central axis of the drive shaft 50 is generally longer than a length of the contact surface of the inner circumferential side of the wedge member 40a or 40b in the radial direction of the central axis of the drive shaft 50. Accordingly, an initial torque required for separating the contact surface of the outer circumferential side of the wedge member 40a or 40b from the inner circumferential surface 35a is larger than an initial torque required for separating the contact surface of the inner circumferential side of the wedge member 40a or 40b from the outer circumferential surface 24a. According to the aforementioned configuration of the seat reclining apparatus 4 of the embodiment, the pressing force line F passing through the pressing point P is designed to be inclined toward the inward side relative to the intermediate line M in the radial direction of the central axis of the drive shaft 50 in a case where the dimensional variations in manufacturing occur. Therefore, the contact surface of the outer circumferential side of the wedge member 40a or 40b relative to the inner circumferential surface 35a may easily separate from the inner circumferential surface 35a. As a result, the driving force of the drive shaft 50 for rotating the wedge members 40a and 40b may be reduced.

According to the aforementioned embodiment, the pressing point P via which the drive shaft 50 presses the wedge member 40a or 40b is arranged at the outward side relative to the intermediate position in the radial direction of the protruding portion 41.

According to the aforementioned embodiment, in a state where the biasing force of the retaining spring 45 is largest because of the dimensional variations in manufacturing, the drive shaft 50 presses the wedge member 40a or 40b while being in surface contact with the wedge member 40a or 40b.

According to the aforementioned configuration of the seat reclining apparatus 4 of the embodiment, for example, the load of the retaining spring 45 for biasing the wedge members 40a and 40b is largest because of the dimensional variations in manufacturing and the initial driving force of the drive shaft 50 for rotating the wedge members 40a and 40b is therefore largest. At this time, the drive shaft 50 (the pressing surface 55) and the wedge member 40a or 40b (the pressure receiving surface 44) are entirely brought into contact with each other; thereby, a load may be substantially equally received by both the drive shaft 50 and the wedge member 40a or 40b. Therefore, wear of contact portions of the wedge member 40a or 40b relative to the drive shaft 50 may be minimized. As a result, the strength of the drive shaft 50 or the wedge member 40a or 40b may be increased.

According to the aforementioned embodiment, the drive shaft 50 includes the pressing surface 55, 71 and each of the wedge members 40a and 40b includes the pressure receiving surface 44, 72. The pressing surface 55, 71 and the pressure receiving surface 44, 72 are contactable with each other via the contact point. One of the pressing surface 55 and the pressure receiving surface 44 is designed to have the linear shape and the other of the pressing surface 71 and the pressure receiving surface 72 is designed to have the circular arc shape.

According to the aforementioned embodiment, the drive shaft 50 includes the cam portion 52 having the circular arc shape. The end surface of the cam portion 52 in the circumferential direction of the cam portion 52 serves as the pressing surface 55 relative to the protruding portion 41.

According to the aforementioned embodiment, the intermediate line M is the line bisecting the acute angle formed by the first tangent line T1 passing through the radially inward contact point C1 contactable with the boss portion 24 and the second tangent line T2 passing through the radially outward contact point C2 contactable with the bush 35.

Accordingly, when the wedge member 40a or 40b is pressed by the drive shaft 50 so as to rotate in the direction from the small clearance portion to the large clearance portion of the accommodating chamber S, the friction resistance of the wedge member 40a or 40b may be reduced approximately to the minimum. In addition, the driving force of the drive shaft 50 for rotating the wedge members 40a and 40b may be reduced approximately to the minimum.

According to the aforementioned embodiment, the upper plate 31 and the bush 35 are integrally formed with each other.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat reclining apparatus, comprising:

a first member configured to be attached to one of a seat cushion and a seat back and including an internal gear and a first tubular portion positioned coaxially with the internal gear and arranged at an inner circumferential side of the internal gear;

a second member configured to be attached to the other of the seat cushion and the seat back and including an external gear and a second tubular portion into which the first tubular portion is inserted, the external gear having teeth fewer than teeth of the internal gear and engaging with the internal gear, the second tubular portion being positioned coaxially with the external gear and arranged at an inner circumferential side of the external gear;

a pair of wedge members arranged in an annular accommodating chamber formed between an outer circumferential surface of the first tubular portion and an inner circumferential surface of the second tubular portion, each of the wedge members including a protruding portion axially protruding from the accommodating chamber;

a biasing member biasing the pair of wedge members in a direction to separate the pair of wedge members from each other in a circumferential direction of the pair of wedge members;

an input member having a central axis coaxial with the first tubular portion, the input member rotates to press the protruding portion along the circumferential direction to rotate the pair of wedge members in the circumferential direction to move an engagement position between the internal gear and the external gear in the circumferential direction;

a pressing point via which the input member presses the wedge member;

a radially inward contact point via which the wedge member is contactable with the first tubular portion; and a radially outward contact point via which the wedge member is contactable with the second tubular portion, wherein in a state where a biasing force of the biasing member is largest because of a dimensional variation in manufacturing, a pressing force line passing through the pressing point via which the input member presses the wedge member is designed to be identical to an intermediate line between a first tangent line passing through the radially inward contact point and a second tangent line passing through the radially outward contact point, wherein the input member includes a first contact surface configured to have a circular portion at a radially outward side of the input member, the circular portion protruding toward a second contact surface of the wedge member, and wherein the first contact surface contacts the second contact surface via the pressing point which is arranged on the circular portion.

2. The seat reclining apparatus according to claim 1, wherein in a case where the dimensional variation in manufacturing occurs, the pressing force line passing through the pressing point is designed to be inclined toward an inward side relative to the intermediate line in a radial direction of the central axis of the input member.

3. The seat reclining apparatus according to claim 2, wherein the pressing point via which the input member presses the wedge member is arranged at a radially outward side of the protruding portion.

4. The seat reclining apparatus according to claim 3, wherein in a state where the biasing force of the biasing member is largest because of the dimensional variation in manufacturing, the input member presses the wedge member while being in surface contact with the wedge member.

5. The seat reclining apparatus according to claim 2, wherein in a state where the biasing force of the biasing member is largest because of the dimensional variation in manufacturing, the input member presses the wedge member while being in surface contact with the wedge member.

6. The seat reclining apparatus according to claim 1, wherein in a state where the biasing force of the biasing member is largest because of the dimensional variation in manufacturing, the input member presses the wedge member while being in surface contact with the wedge member.

7. The seat reclining apparatus according to claim 1, wherein the second contact surface is configured to have a linear shape.

8. The seat reclining apparatus according to claim 1, wherein the input member includes a cam portion having that includes the circular portion, the circular portion a circular arc shape, and an end surface of the cam portion in a circumferential direction of the cam portion serves as a pressing surface relative to the protruding portion.

9. The seat reclining apparatus according to claim 1, wherein the intermediate line is a line bisecting an acute angle formed by the first tangent line passing through the radially inward contact point contactable with the first tubular portion and a second tangent line passing through the radially outward contact point contactable with the second tubular portion.

10. The seat reclining apparatus according to claim 1, wherein the second member and the second tubular portion are integrally formed with each other.

* * * * *